(12) United States Patent
Shimizu

(10) Patent No.: US 10,443,564 B2
(45) Date of Patent: Oct. 15, 2019

(54) MAGNUS TYPE THRUST GENERATING DEVICE

(71) Applicant: CHALLENERGY INC., Tokyo (JP)

(72) Inventor: Atsushi Shimizu, Tokyo (JP)

(73) Assignee: CHALLENERGY INC., Tokyo (JP)

( * ) Notice: Subject to any disclaimer, the term of this patent is extended or adjusted under 35 U.S.C. 154(b) by 133 days.

(21) Appl. No.: 15/736,572

(22) PCT Filed: Jun. 27, 2016

(86) PCT No.: PCT/JP2016/069000
§ 371 (c)(1),
(2) Date: Dec. 14, 2017

(87) PCT Pub. No.: WO2017/002757
PCT Pub. Date: Jan. 5, 2017

(65) Prior Publication Data
US 2018/0171969 A1 Jun. 21, 2018

(30) Foreign Application Priority Data

Jul. 1, 2015 (JP) .................................. 2015-133148

(51) Int. Cl.
*F03D 3/00* (2006.01)
*F03B 13/26* (2006.01)
(Continued)

(52) U.S. Cl.
CPC .............. *F03D 3/007* (2013.01); *F03B 13/26* (2013.01); *F03B 13/264* (2013.01);
(Continued)

(58) Field of Classification Search
CPC .......... F03D 1/0616; F03D 3/007; F03D 3/06; F03D 3/061; F03D 5/04; F03D 80/00;
(Continued)

(56) References Cited

U.S. PATENT DOCUMENTS 1,791,731 A   2/1931 Madarasz
2,344,515 A * 3/1944 Massey ................... B64C 23/08
                                                           244/10

(Continued)

FOREIGN PATENT DOCUMENTS

DE   102005001236 A1   7/2006
EP        2602479 A1   6/2013
(Continued)

OTHER PUBLICATIONS

Europe Patent Office, "Search Report for European Patent Application No. 16817865.5," dated Dec. 10, 2018.
(Continued)

*Primary Examiner* — Igor Kershteyn
(74) *Attorney, Agent, or Firm* — Manabu Kanesaka

(57) ABSTRACT

A thrust generating device has a simple structure and can effectively control the magnitude of a Magnus force generated at a cylindrical blade in accordance with the direction of a flow acting on the cylindrical blade. A Magnus-type thrust generating device includes a first member that has a first rotational axis and that can rotate about the first rotational axis; and a second member that is disposed at a rear surface side in an advancement direction of the first member 1. (M−L)/L<2 is satisfied, where L is the distance from the first rotational axis to the most distant part of the surface of the first member and M is the distance from the first rotational axis to the closest part of the surface of the second member in a plane perpendicular to the first rotational axis of the Magnus-type thrust generating device.

6 Claims, 7 Drawing Sheets

(51) Int. Cl.
*F03D 1/06* (2006.01)
*F03D 3/06* (2006.01)
*F03D 5/04* (2006.01)
*F03G 7/00* (2006.01)
*F03D 80/00* (2016.01)
*F03B 17/06* (2006.01)

(52) U.S. Cl.
CPC .......... *F03B 17/062* (2013.01); *F03D 1/0616* (2013.01); *F03D 3/06* (2013.01); *F03D 3/061* (2013.01); *F03D 5/04* (2013.01); *F03D 80/00* (2016.05); *F03G 7/00* (2013.01); *F05B 2210/16* (2013.01); *F05B 2240/201* (2013.01); *Y02E 10/28* (2013.01); *Y02E 10/38* (2013.01); *Y02E 10/70* (2013.01); *Y02E 10/721* (2013.01); *Y02E 10/74* (2013.01)

(58) Field of Classification Search
CPC ...... F03B 13/26; F03B 13/264; F03B 17/062; F03G 7/00; F05B 2210/16; F05B 2240/201; Y02E 10/28; Y02E 10/38; Y02E 10/70; Y02E 10/721; Y02E 10/74
See application file for complete search history.

(56) References Cited

U.S. PATENT DOCUMENTS

| | | | | |
|---|---|---|---|---|
| 4,366,386 | A * | 12/1982 | Hanson | F03D 1/0616 290/44 |
| 4,446,379 | A * | 5/1984 | Borg | F03D 3/007 290/55 |
| 4,576,581 | A * | 3/1986 | Borg | B63H 1/26 244/206 |
| 6,172,429 | B1 * | 1/2001 | Russell | F03D 9/008 290/54 |
| 7,781,905 | B2 * | 8/2010 | Newman | F03D 1/0616 290/54 |
| 7,989,973 | B2 * | 8/2011 | Birkestrand | E02B 9/00 290/44 |
| 8,253,264 | B2 * | 8/2012 | Becker | F03D 5/02 290/44 |
| 8,492,921 | B2 * | 7/2013 | Douglas | F03B 5/00 290/43 |
| 2007/0046029 | A1 | 3/2007 | Murakami et al. | |
| 2009/0058091 | A1 | 3/2009 | Douglas | |
| 2014/0008916 | A1 | 1/2014 | Shimizu | |

FOREIGN PATENT DOCUMENTS

| | | |
|---|---|---|
| FR | 608280 A | 7/1926 |
| GB | 2386160 A | 9/2003 |
| JP | S55-040257 A | 3/1980 |
| JP | 2007-85327 A | 4/2007 |
| JP | 2008-082185 A | 4/2008 |
| JP | 2008-106619 A | 5/2008 |
| JP | 2008-175070 A | 7/2008 |
| JP | 2010-121518 A | 6/2010 |
| JP | 2010-143530 A | 7/2010 |
| RU | 2213883 C2 | 10/2003 |
| WO | 81/00435 A1 | 2/1981 |
| WO | 2013/014848 A1 | 1/2013 |

OTHER PUBLICATIONS

Russia Patent Office, "Search Report for Russian Patent Application No. 2018103739," dated Nov. 28, 2018.

PCT/ISA/210, "International Search Report for International Application No. PCT/JP2016/069000," dated Sep. 13, 2016.

* cited by examiner

MAGNUS TYPE THRUST GENERATING DEVICE

RELATED APPLICATIONS

The present application is National Phase of International Application No. PCT/JP2016/069000 filed Jun. 27, 2016, and claims priority from Japanese Application No. 2015-133148, filed Jul. 1, 2015, the disclosure of which is hereby incorporated by reference herein in its entirety.

TECHNICAL FIELD

The present invention relates to a thrust generating device using the Magnus force that a substantially cylindrical wing rotating in fluid generates, a wind power rotating device, a hydraulic rotating device, a tidal power rotating device which are rotated by using the thrust generating device, and a fluid machinery such as a wind power generator, a hydraulic power generator, and tidal power generator rotated using the thrust generating device.

BACKGROUND ART

There are conventionally known devices utilizing the Magnus force that a cylindrical wing rotated in fluid generates.

CITATION LIST

Patent Document

Patent Document 1: JP 2010-143530 A
Patent Document 2: JP 2008-106619 A
Patent Document 3: JP 2007-85327 A
Patent Document 4: JP 2008-82185 A
Patent Document 5: JP 2008-175070 A
Patent Document 6: JP 2010-121518 A
Patent Document 7: JP WO2013/014848

DISCLOSURE OF THE INVENTION

Problems to be Solved by the Invention

A vehicular aerodynamic control device as described in Patent Document 1 is aimed at obtaining downforce to be applied to a vehicle by utilizing the Magnus force generated by rotation of a cylindrical wing.

A composite Magnus wing as described in Patent Document 2 is aimed at obtaining a torque of a horizontal axis wind turbine or airplane lift force by utilizing the Magnus force.

A Magnus type wind turbine as described in Patent Document 3 or Patent Document 4 is aimed at obtaining a torque of a horizontal axis wind turbine by utilizing the Magnus force.

When the Magnus force is utilized in a vehicle or an airplane as in Patent Document 1 or Patent Document 2, airflow acting on the cylindrical wing is a relative wind speed due to movement of a vehicle or an airplane, and it is assumed that the direction of airflow is determined by the travelling direction of a vehicle or an airplane and is basically fixed.

Further, when the Magnus force is utilized in a horizontal axis windmill as in Patent Document 3 or Patent Document 4, a wind receiving surface is made to face the wind direction under yaw axis control for the windmill, so that it is assumed that the direction of airflow acting on the cylindrical wing is basically fixed.

However, when the Magnus force is utilized in, e.g., a vertical axis windmill, the direction of airflow acting on the cylindrical wing is constantly changed by a wind direction of the moment or rotational movement of the windmill itself, so that the assumption as in Patent Document 1 to Patent Document 4 cannot be made.

Further, in the case of the vertical axis windmill, the direction of the Magnus force generated when the cylindrical wing is rotated in one direction is the same on both the windward side and leeward side of the windmill, so that the directions of torques of the vertical axis windmill on the both sides are opposed to each other and thus cancel each other. Thus, the configuration of the horizontal axis windmill cannot be applied to the vertical axis windmill as it is.

Patent Document 5 describes a method that suppresses the Magnus force of the opposite direction generated on the leeward side of the windmill by shielding a cylindrical wing on the leeward side by a wind screen device provided at the center of the windmill.

However, the wind screen device provided at the center of the windmill cannot shield the cylindrical wing over the entire area of the leeward side of the windmill, so that it is difficult to efficiently suppress the Magnus force of the opposite direction generated on the leeward side of the windmill.

Patent Document 6 describes a method that generates windmill torques of the same direction on the windward side and the leeward side of the windmill by making the rotation direction of the cylindrical wing different between the windward side and leeward side of the windmill to change the direction of the Magnus force.

However, since the cylindrical wings need to be changed in direction individually and frequently according to the wind direction, complicated control is required. Further, in an environment where the wind direction is frequently changed, the change of the rotation direction of the cylindrical wing does not catch up with the change of the wind direction, which may degrade power generation efficiency.

Patent Document 7 describes a method that generates windmill torques of the same direction on the windward side and leeward side by making two cylindrical wings into a pair and rotating them in opposite directions.

This method makes it possible to always generate the windmill torques of the same direction even when the wind direction is frequently changed; however, much cost is required for use of the pair of the cylindrical wings.

The present invention has been made in view of the above problems, and the object thereof is to provide a simply-structured thrust generating device capable of efficiently controlling the magnitude of the Magnus force generated by the cylindrical wing depending on the direction of a flow acting on the cylindrical wing.

Means for Solving the Problems

To attain the above object, there is provided a first aspect that is a Magnus type thrust generating device including:

a first member having a first rotation axis and rotatable about the first rotation axis; and a second member disposed on the back surface side with respect to the travelling direction of the first member, wherein the first and second members are revolvable around the second rotation axis, and in a plane perpendicular to the first rotation axis of the Magnus type thrust generating device, (M−L)/L<2 is satisfied where L is the distance between the first rotation axis and a part of the surface of the first member that is farthest from the first rotation axis, and M is the distance between the first rotation axis and a part of the surface of the second member that is closest to the first rotation axis.

A second aspect is the Magnus type thrust generating device according to the first invention, wherein the second member has a substantially plate-like shape extending in the direction opposite to the travelling direction of the first member.

A third aspect is the Magnus type thrust generating devices according to the first or second inventions, wherein the second member has a substantially streamlined shape extending in the direction opposite to the travelling direction of the first member.

A fourth aspect is the Magnus type thrust generating device according to any one of the first to third inventions, wherein the second member has optional unevenness on its surface.

A fifth aspect is the Magnus type thrust generating device according to any one of the first to fourth inventions, wherein the first member has optional unevenness on its surface.

A sixth aspect is a wind power rotating device, a hydraulic rotating device, or a tidal power rotating device using a Magnus type thrust generating device according to any one of the first to fifth inventions.

Advantages of the Invention

When the first member is rotated in fluid, a flow is accelerated by the rotation of the first member in a region (flow acceleration side) where the flow direction and the rotation direction of the first member coincide with each other, with the result that the pressure on the surface of the first member is reduced, while a flow is decelerated by the rotation of the first member in a region (flow deceleration side) where the flow direction and the rotation direction of the first member are opposed to each other, with the result that the pressure on the surface of the first member is increased.

The difference between the pressure on the flow acceleration side and the pressure on the flow deceleration side produces a thrust force (Magnus force), so that the Magnus force acts in the direction perpendicular to the flow direction.

When the plate-like second member is provided on the flow acceleration side at a position where the distance between the second member and the surface of the first member does not exceed the diameter of the first member, the flow on the flow acceleration side is blocked by the second member to be decelerated, making it hard to lower the pressure on the flow acceleration side surface of the first member. It follows that the pressure difference between the flow acceleration side surface of the first member and the flow deceleration side surface thereof is reduced, with the result that the magnitude of the Magnus force generated in the first member is reduced.

Similarly, when the second member is provided on the flow deceleration side at a position where the distance between the second member and the surface of the first member is smaller than the diameter of the first member, the flow on the flow deceleration side is blocked by the second member to be decelerated. However, the flow deceleration side is originally a side on which the flow is decelerated, so that a large difference does not occur in the degree of deceleration of the flow depending on the presence/absence of the second member. Thus, even when the second member is provided on the flow deceleration side of the first member, the pressure on the surface of the first member is equivalent to that when the second member is absent. It follows that the pressure difference between the flow acceleration side surface of the first member and the flow deceleration side surface thereof does not change significantly, with the result that the magnitude of the Magnus force generated in the first member is equivalent to that when the second member is absent on the flow deceleration side of the first member.

In the first invention, when the second member is provided on the back surface side with respect to the travelling direction of the first member, the second member is positioned on the flow acceleration side or flow deceleration side of the first member, depending on the flow direction with respect to the travelling direction of the first member.

It is assumed here that the first invention is applied to a vertical axis windmill and that the rotation direction of the windmill, i.e., travelling direction of the first member is set to the clockwise direction of the windmill.

To set the direction of the Magnus force generated in the first member on the windward side of the windmill in the direction in which the windmill is rotated clockwise as a whole, the first member is rotated clockwise.

At this time, the second member provided on the back surface side with respect to the travelling direction of the first member exists in a range of the flow deceleration side of the first member.

Thus, the magnitude of the Magnus force in the clockwise direction of the windmill, which is generated in the first member on the windward side of the windmill, is equivalent to that when the second member is absent.

On the other hand, on the leeward side of the windmill, the direction of the Magnus force generated in the first member being rotated clockwise is set in the direction in which the windmill is rotated counterclockwise as a whole.

At this time, the second member provided on the back surface side with respect to the travelling direction of the first member exists in a range of the flow acceleration side of the first member.

Thus, the magnitude of the Magnus force in the counterclockwise direction of the windmill, which is generated in the first member on the leeward side of the windmill, is reduced as compared to that when the second member is absent.

Therefore, a torque on the windward side of the windmill and a torque on the leeward side do not cancel each other, with the result that the windmill is rotated clockwise.

Further, the flow deceleration effect when the second member is provided on the flow acceleration side of the first member can be enhanced by making the distance between the second member and the surface of the first member equal to or less than the diameter of the first member, so that it is possible to control the magnitude of the Magnus force generated in the first member more efficiently.

As described above, a thrust generating device capable of efficiently controlling the magnitude of the Magnus force generated in the first member according to the direction of the flow acting on the first member can be provided by the simply-structured second member.

In the second invention, by forming the second member into a substantially plate-like shape extending in the opposite direction with respect to the travelling direction of the first member, it is possible to control more efficiently the Magnus force generated in the first member according to the direction of the flow acting on the first member.

It is assumed here that the second invention is applied to a vertical axis windmill and that the rotation direction of the windmill, i.e., travelling direction of the first member is set to the clockwise direction of the windmill.

At this time, the azimuth angle of the Magnus type thrust generating device is defined as clockwise with the wind inflow direction is 0 degrees. In this case, the second member provided on the back surface side with respect to the travelling direction of the first member is positioned at the center position on the flow deceleration side of the first member when the azimuth angle is 0 degrees, at a 45-degree position from the center of the flow deceleration side of the first member toward the windward side when the azimuth angle is 45 degrees, and at 90-degree position from the center of the flow deceleration side of the first member toward the windward side when the azimuth angle is 90 degrees, i.e., at the boundary between the flow deceleration side and the flow acceleration side.

At this time, when the width of the second member in the perpendicular direction with respect to the travelling direction of the first member is large, the end portion of the second member blocks even a region of the flow acceleration side of the first member as the azimuth angle becomes larger in a range of 0 degrees to 90 degrees. Thus, the flow on the flow acceleration side is blocked, with the result that the Magnus force generated in the first member is undesirably reduced.

By forming the second member into a substantially plate-like shape having a small width in the perpendicular direction with respect to the travelling direction of the first member, the end portion of the second member hardly blocks a region of the flow acceleration side even when the azimuth angle becomes larger in a range of 0 degrees to 90 degrees. Thus, it is possible to prevent the Magnus force generated in the first member from being reduced.

In the third invention, the end portion of the second member hardly blocks a region of the flow acceleration side even when the azimuth angle becomes larger in a range of 0 degrees to 90 degrees to thereby prevent reduction in the Magnus force generated in the first member, as in the second invention. Further, in the third invention, by forming the second member into a substantially streamlined shape, the fluid resistance of the second member can be reduced.

In the fourth invention, a flow control unit having optional unevenness such as grooves, dimples, projections or vortex generators are formed on the surface of the second member. This can reduce fluid resistance of the second member and noise such as wind noise.

In the fifth invention, optional unevenness such as projections or cuts are formed on the surface of the first member. This can increase the Magnus force generated in the cylindrical wing 1.

In the sixth invention, when the Magnus type thrust generating devices according to the first to fifth inventions are each applied to a wind rotating device, a hydraulic rotating device, and a tidal power rotating device each of which has a vertical axis or a horizontal axis extending in the perpendicular direction with respect to the flow, the Magnus force exerted in the direction of reversely rotating the rotating device that occurs on the downstream side when the first member is rotated in one direction can be suppressed by the simply-structured second member, thereby enhancing rotation efficiency of the rotating device.

BEST MODE FOR CARRYING OUT THE INVENTION

Specific embodiments of the present invention will be described below. The embodiments are merely illustrative, and the present invention is not limited thereto.

First Embodiment

A Magnus type thrust generating device according to a first embodiment of the present invention will be described.

Figure 1A:
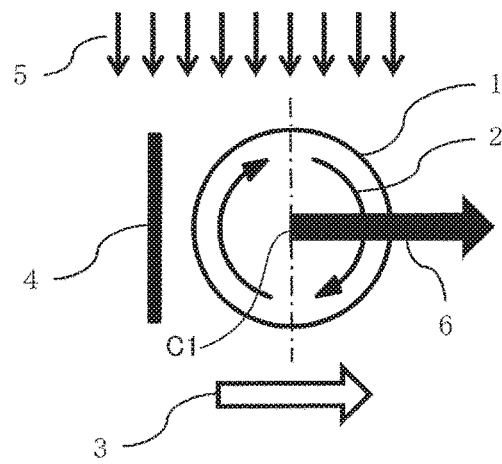
FIGS. 1A and 1B are plan views each illustrating a Magnus type thrust generating device according to a first embodiment of the present invention.
Figure 1B:
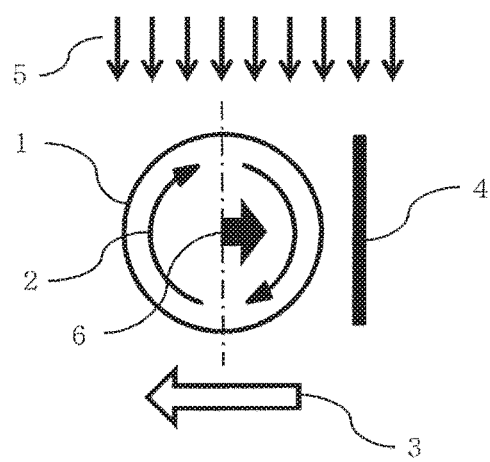

FIGS. 1A and 1B are plan views each illustrating the Magnus type thrust generating device according to the first embodiment of the present invention.

In the positional relationship illustrated in FIG. 1A, a flow direction 5 is set to the downward direction on the paper surface, and a travelling direction 3 of a cylindrical wing 1 is set to the rightward direction on the paper surface. A plate-like flow blocking unit 4 is provided on the back surface side with respect to the travelling direction 3 of the cylindrical wing 1, i.e., on the paper surface left side of the cylindrical wing 1 at a position where the distance between the flow blocking unit 4 and the surface of the cylindrical wing 1 does not exceed the diameter of the cylindrical wing 1.

The cylindrical wing 1 is an example of a first member of the present invention, and the flow blocking unit 4 is an example of a second member of the present invention.

The "back surface side with respect to the travelling direction 3 of the cylindrical wing 1" refers to the opposite side area of the travelling direction 3 of two areas of the cylindrical wing 1 divided by a plane including a first rotation axis C1 of the cylindrical wing 1 (first member) and perpendicular to the travelling direction 3. In the example of FIG. 1A, the left side part of the dashed dotted line corresponds to the "back surface side with respect to the travelling direction 3 of the cylindrical wing 1".

At this time, when a rotation direction 2 about the first rotation axis C1 of the cylindrical wing 1 is set to the clockwise direction, the left side part with respect to the dashed dotted line (center line of the cylindrical wing 1) serves as a flow deceleration side since the flow direction 5 and the rotation direction 2 of the cylindrical wing 1 are opposite to each other, while the right part of the dashed dotted line serves as a flow acceleration side since the flow direction 5 and the rotation direction 2 of the cylindrical wing 1 are the same. As described later, the cylindrical wing 1 and the flow blocking unit 4 can revolve around a second rotation axis 12.

The cylindrical wing 1 has a high surface pressure on the flow deceleration side, while it has a low surface pressure on the flow acceleration side, with the result that a Magnus force 6 is generated in the right direction perpendicular to the flow direction 5.

That is, the travelling direction 3 of the cylindrical wing 1 and the direction of the Magnus force 6 coincide with each other.

The flow blocking unit 4 is positioned on the flow deceleration side of the cylindrical wing 1, so that the flow on the flow deceleration side is blocked by the flow blocking unit 4. However, the flow deceleration side is originally a side on which the flow is decelerated, so that the surface pressure on the flow deceleration side of the cylindrical wing 1 is equivalent to that when the flow blocking unit 4 is absent. It follows that the surface pressure difference between the flow deceleration side and the flow acceleration side is also equivalent to that when the flow blocking unit 4 is absent, with the result that the magnitude of the Magnus force 6 generated in the cylindrical wing 1 is equivalent to that when the flow blocking unit 4 is absent.

In the positional relationship illustrated in FIG. 1B, the flow direction 5 is set to the downward direction on the paper surface, and the travelling direction 3 of the cylindrical wing 1 is set to the leftward direction on the paper surface. The plate-like flow blocking unit 4 is provided on the back surface side with respect to the travelling direction 3 of the cylindrical wing 1, i.e., on the paper surface right side of the cylindrical wing 1 (the right side part with respect to the dashed dotted line).

At this time, it is assumed that the rotation direction 2 of the cylindrical wing 1 is the clockwise direction. In this case, the left side part with respect to the dashed dotted line (center line of the cylindrical wing 1) is the flow deceleration side since the flow direction 5 and the rotation direction 2 of the cylindrical wing 1 are opposite to each other, while the right part with respect to the dashed dotted line is the flow acceleration side since the flow direction 5 and the rotation direction 2 of the cylindrical wing 1 are the same.

The cylindrical wing 1 has a high surface pressure on the flow deceleration side, while it has a low surface pressure on the flow acceleration side, with the result that the Magnus force 6 is generated in the right direction perpendicular to the flow direction 5.

That is, the travelling direction 3 of the cylindrical wing 1 and the direction of the Magnus force 6 are opposed to each other.

The flow blocking unit 4 is positioned on the flow acceleration side of the cylindrical wing, so that the flow on the flow acceleration side is blocked by the flow blocking unit 4 to be decelerated, making it hard to lower the surface pressure on the flow acceleration side of the cylindrical wing 1. It follows that the surface pressure difference between the flow acceleration side and the flow deceleration side is reduced, with the result that the magnitude of the Magnus force 6 generated in the cylindrical wing 1 is reduced.

Figure 2A:
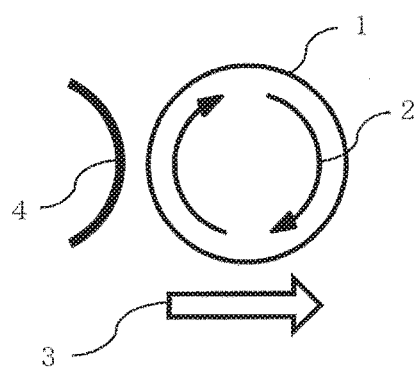
FIGS. 2A to 2C are plan views each illustrating a modification of a flow blocking unit of the Magnus type thrust generating device according to the first embodiment of the present invention.
Figure 2B:
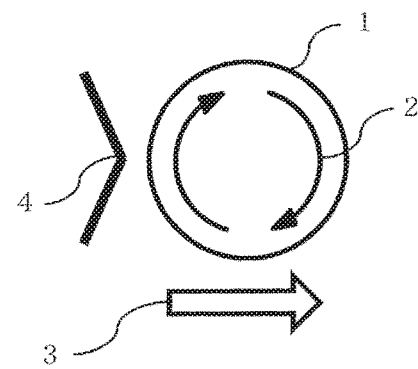

Although the flow blocking unit 4 has a linear shape in the example of FIGS. 1A and 1B, it may have a substantially circular arc shape as illustrated in FIG. 2A or a substantially V-like shape as illustrated in FIG. 2B.

When the flow blocking unit 4 is formed into a substantially circular arc shape or a substantially V-like shape, the drag of the flow blocking unit 4 can also be utilized as auxiliary thrust for the cylindrical wing 1, depending on the flow direction.

Figure 2C:
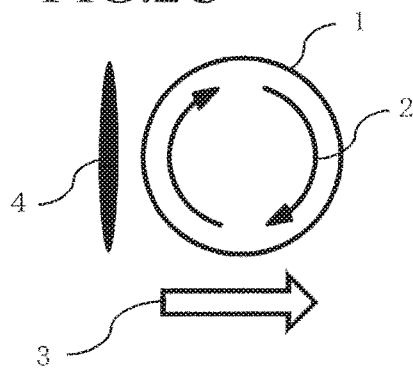

The flow blocking unit 4 may not necessarily have a uniform thickness and may be formed into a substantially streamlined shape as illustrated in FIG. 2C.

As described above, the flow blocking unit 4 may be any tangible object having an optional shape as long as it can have some kind of influence on the flow on the surface of the cylindrical wing 1, and it is clear that such tangible object has some kind of influence on the flow on the surface of the cylindrical wing 1.

Second Embodiment

Next, a Magnus type thrust generating device according to a second embodiment of the present invention will be described.

The Magnus type thrust generating device according to the second embodiment is the same in basic configuration as the first embodiment but differs therefrom in that the flow blocking unit has a substantially plate-like shape extending in the direction opposite to the travelling direction of the cylindrical wing 1.

Figure 3A:
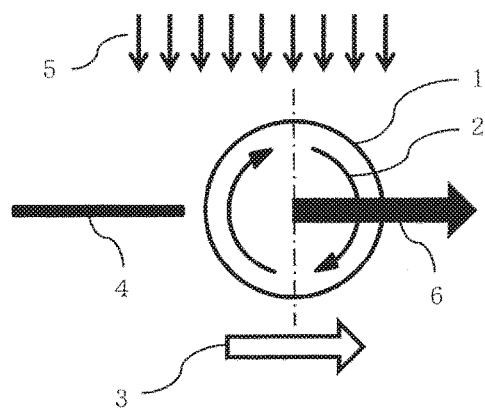
FIGS. 3A and 3B are plan views each illustrating a Magnus type thrust generating device according to a second embodiment of the present invention.
Figure 3B:
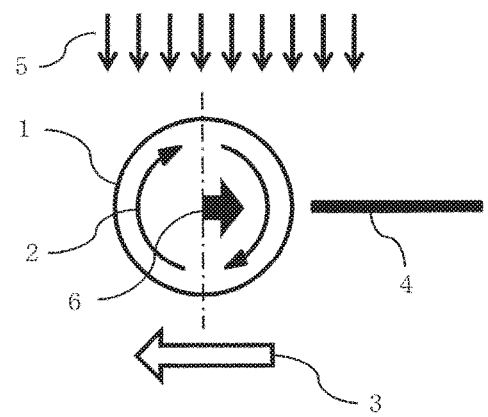

FIGS. 3A and 3B are plan views each illustrating the Magnus type thrust generating device according to the second embodiment of the present invention.

In the positional relation ship illustrated in FIG. 3A, the flow direction 5 is set to the downward direction on the paper surface, and the travelling direction 3 of the cylindrical wing 1 is set to the rightward direction on the paper surface. The plate-like flow blocking unit 4 extending in the direction opposite to the travelling direction 3 of the cylindrical wing, that is, in the leftward direction on the paper surface is provided on the back surface side with respect to the travelling direction 3 of the cylindrical wing 1, i.e., on the paper surface left side of the cylindrical wing 1 (left side part with respect to the dashed dotted line) at a position where the distance between the flow blocking unit 4 and the surface of the cylindrical wing 1 does not exceed the diameter of the cylindrical wing 1.

The cylindrical wing 1 is an example of the first member of the present invention, and the flow blocking unit 4 is an example of the second member of the present invention.

At this time, when the rotation direction 2 of the cylindrical wing 1 is set to the clockwise direction, the Magnus force 6 is generated in the right direction perpendicular to the flow direction 5 as in the example of FIG. 1A in the first embodiment.

That is, the travelling direction 3 of the cylindrical wing 1 and the direction of the Magnus force 6 coincide with each other.

The flow blocking unit 4 is positioned on the flow deceleration side of the cylindrical wing 1, so that, as in the example of FIG. 1A in the first embodiment, the magnitude of the Magnus force 6 generated in the cylindrical wing 1 is equivalent to that when the flow blocking unit 4 is absent.

In the positional relationship illustrated in FIG. 3B, the flow direction 5 is set to the downward direction on the paper surface, and the travelling direction 3 of the cylindrical wing is set to the leftward direction on the paper surface. The plate-like flow blocking unit 4 extending in the direction opposite to the travelling direction 3 of the cylindrical wing 1, that is, in the rightward direction on the paper surface is provided on the back surface side with respect to the travelling direction 3 of the cylindrical wing 1, i.e., on the paper surface right side of the cylindrical wing 1 (right side part with respect to the dashed dotted line).

At this time, when the rotation direction 2 of the cylindrical wing is set to the clockwise direction, the Magnus force 6 is generated in the right direction perpendicular to the flow direction 5 as in the example of FIG. 1B in the first embodiment.

That is, the travelling direction 3 of the cylindrical wing and the direction of the Magnus force 6 are opposed to each other.

The flow blocking unit 4 is positioned on the flow acceleration side of the cylindrical wing 1, so that, as in the example of FIG. 1B in the first embodiment, the magnitude of the Magnus force 6 generated in the cylindrical wing 1 is reduced.

Effects of the second embodiment differ from those of the first embodiment when an azimuth angle 13 between the flow direction 5 and the Magnus type thrust generating device of the present invention is not 0 degrees.

Figure 4A:
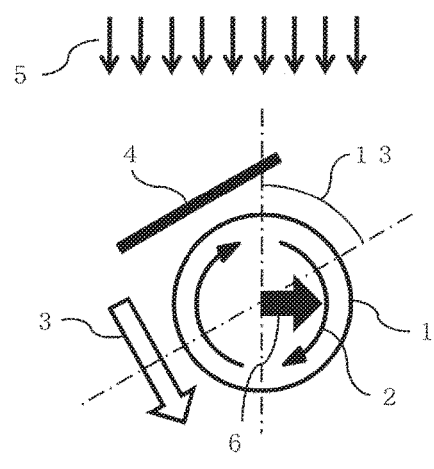
FIGS. 4A and 4B are plan views each illustrating the difference between the Magnus type thrust generating devices according to the first and second embodiments of the present invention.

As illustrated in FIG. 4A, when the width of the flow blocking unit 4 in the perpendicular direction with respect to the travelling direction 3 of the cylindrical wing 1 is large, the end portion of the flow blocking unit 4 blocks even the right side part of the dashed dotted line parallel to the flow direction 5, i.e., the flow acceleration side area of the cylindrical wing 1, depending on the azimuth angle 13, so that the flow on the flow acceleration side is blocked, resulting in reduction in the magnitude of the Magnus force 6 generated in the cylindrical wing 1.

Figure 4B:
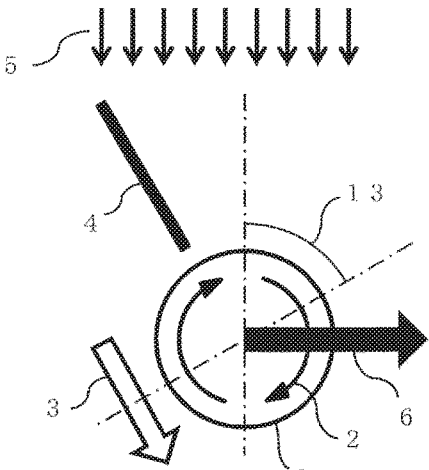

As illustrated in FIG. 4B, when the flow blocking unit 4 is formed into a substantially plate-like shape having a width in the perpendicular direction with respect to the travelling direction 3 of the cylindrical wing like the flow blocking unit 4 of the second embodiment, the end portion of the flow blocking unit 4 hardly blocks the flow acceleration side area, regardless of the azimuth angle 13, making it possible to prevent the magnitude of the Magnus force 6 generated in the cylindrical wing 1 from being reduced.

Figure 5:
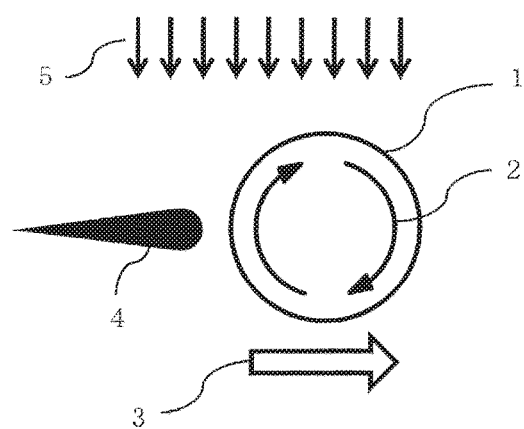
FIG. 5 is a plan view illustrating a modification of a flow blocking unit of the Magnus type thrust generating device according to the second embodiment of the present invention.

The flow blocking unit 4 extending in the direction opposite to the travelling direction 3 of the cylindrical wing 1 may not necessarily be formed into a plate-like shape and may be formed into a substantially streamlined shape as illustrated in FIG. 5. When the flow blocking unit 4 is formed into a substantially streamlined shape, the fluid resistance of the flow blocking unit 4 can be reduced.

Figures 6A, 6B, 6C, 6D:
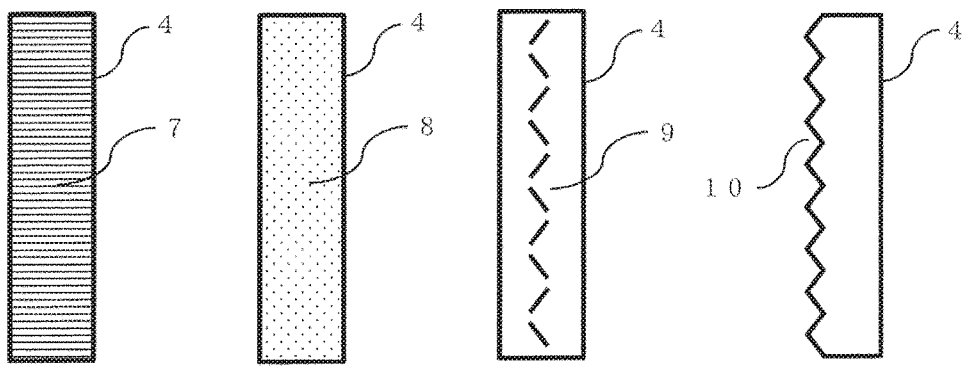
FIGS. 6A to 6D are front views each illustrating a modification of the flow blocking unit of the Magnus type thrust generating device according to the second embodiment of the present invention.

A flow control unit having unevenness such as grooves 7 as illustrated in FIG. 6A, dimples or projections 8 as illustrated in FIG. 6B, or vortex generators 9 as illustrated in FIG. 6C may be formed on the surface of the flow blocking unit 4.

The fluid resistance of the flow blocking unit 4 and noise such as wind noise can be reduced by such a flow control unit.

Further, a flow control unit 10 having unevenness such as projections or cuts as illustrated in FIG. 6D may be formed in the end portion of the flow blocking unit 4.

Noise such as wind noise can be reduced by such a flow control unit.

The flow control unit illustrated in FIGS. 6A to 6D are formed in the flow blocking unit 4; alternatively, however, the unevenness may be formed on the surface of the cylindrical wing 1, and in this case, the same effects as those when the unevenness is formed in the flow blocking unit 4 can be obtained. The groove 7, dimple or projection 8, vortex generator 9, and flow control unit 10 are each an example of unevenness of the second member of the present invention.

Third Embodiment

Next, a wind power rotating device according to a third embodiment of the present invention using the above-described Magnus type thrust generating device will be described.

Figure 7:
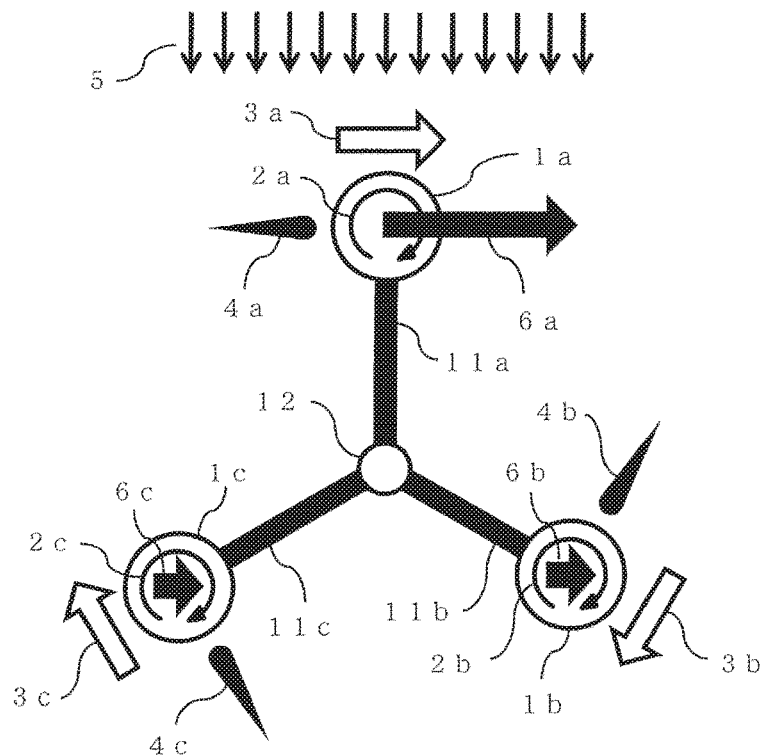
FIG. 7 is a plan view illustrating a wind power rotating device according to a third embodiment of the present invention.

FIG. 7 is a plan view of the wind power rotating device according to the third embodiment of the present invention.

A plurality of support members 11a, 11b, and 11c are mounted to the second rotation axis 12 of the wind power rotating device, and cylindrical wings 1a, 1b, and 1c and flow blocking unit 4a, 4b, and 4c are mounted to the support members 11a, 11b, and 11c, respectively. The flow blocking units 4a, 4b and 4c are each provided at a position where the distance between each of them and the surface of the corresponding cylindrical wing does not exceed the diameter of the cylindrical wing.

The cylindrical wings 1a, 1b, and 1c are each an example of the first member of the present invention, and the flow blocking units 4a, 4b, and 4c are each an example of the second member of the present invention.

The cylindrical wings 1a, 1b, and 1c and flow blocking units 4a, 4b, and 4c can revolve around the second rotation axis 12 through the support members 11a, 11b, and 11c.

The numbers of the support members, cylindrical wings, and flow blocking units mounted to the second rotation axis 12 are each three in this example, but this is merely an example, and the numbers of the above members may be optionally decided.

Figure 8:
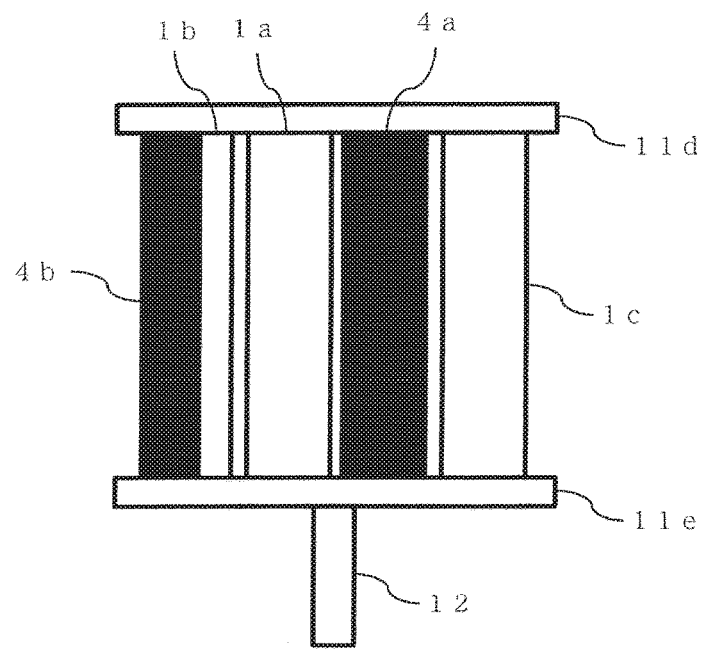
FIG. 8 is a front view illustrating the wind power rotating device according to the third embodiment of the present invention.

As illustrated in FIG. 8, the cylindrical wings 1a, 1b, and 1c and flow blocking units 4a, 4b, and 4c may be supported at their respective both ends by a pair of support members 11d and 11e.

When the cylindrical wings 1a, 1b, and 1c are rotated in airflow, Magnus forces 6a, 6b, and 6c are generated in the respective cylindrical wings 1a, 1b, and 1c, thereby rotating the wind power rotating device around the second rotation axis 12.

The cylindrical wings 1a, 1b, and 1c may be rotated by motors provided at the roots of the respective cylindrical wings 1a, 1b, and 1c, or by a single motor provided near the second rotation axis 12. In the latter case, a torque may be transmitted to the cylindrical wings through chains or belts.

In the third embodiment, the flow direction 5 is set to the downward direction on the paper surface, rotation directions 2a, 2b, and 2c of the respective cylindrical wings are each set to the clockwise direction so as to rotate the wind power rotating device clockwise about the second rotation axis 12, and the flow blocking units 4a, 4b, and 4c are provided on the back surface sides with respect to travelling directions 3a, 3b, and 3c of the respective cylindrical wings.

At this time, the direction of the Magnus force 6a generated in the cylindrical wing 1a disposed on the windward side of the wind power rotating device is the rightward direction on the paper surface, i.e., a direction in which the wind power rotating device is rotated in the clockwise direction.

The flow blocking unit 4a is positioned within a range of the flow deceleration side of the cylindrical wing 1a, so that the magnitude of the Magnus force 6a generated in the cylindrical wing 1a is equivalent to that when the flow blocking unit 4a is absent.

On the other hand, the directions of the Magnus forces 6b and 6c generated in the cylindrical wings 1b and 1c disposed on the leeward side of the wind power rotating device are each also the rightward direction on the paper surface, i.e., a direction in which the wind power rotating device is rotated in the counterclockwise direction.

The flow blocking units 4b and 4c provided on the back surface sides with respect to the travelling directions 3b and 3c of the cylindrical wings are positioned within a range of the flow acceleration sides of the respective cylindrical wings 1b and 1c.

Thus, the magnitudes of the Magnus forces 6b and 6c generated in the cylindrical wings 1b and 1c are reduced as compared to that when the flow blocking units 4b and 4c are absent.

That is, a clockwise torque generated on the windward side of the wind power rotating device and a counterclockwise torque generated on the leeward side do not cancel each other, with the result that the wind power rotating device is rotated clockwise.

As described above, by applying the Magnus type thrust generating device according to the present invention to the wind power rotating device having a vertical axis or a horizontal axis perpendicular to the wind direction, the Magnus force exerted in the direction of reversely rotating the wind power rotating device that is generated on the downstream side of the wind power rotating device when the cylindrical wing is rotated in one direction is suppressed by the simply-structured flow blocking unit, whereby rotation efficiency of the wind power rotating device can be enhanced.

When a generator is mounted to the second rotation axis 12 of the third embodiment, a wind power generator can be obtained.

The torque of the second rotation axis 12 can be utilized as a means for driving a rotating machine such as a pump.

The rotation direction of the wind power rotating device may be set to the counterclockwise direction. In this case, the rotation direction of each cylindrical wing is set to the counterclockwise direction, and the flow blocking unit is provided on the back surface side with respect to the travelling direction of the cylindrical wing.

Although the wind power rotating device is exemplified in the third embodiment, the same can be applied to a hydraulic rotating device and a tidal power rotating device.

Experimental Data

Figure 9:
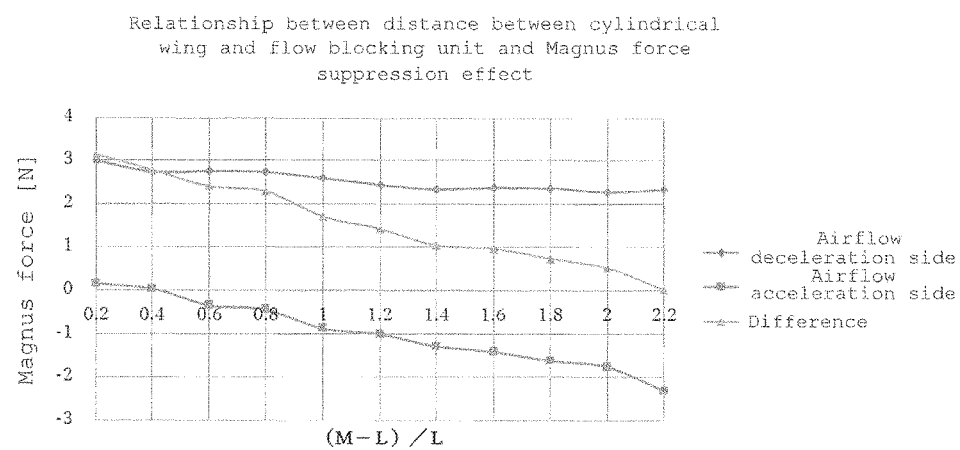
FIG. 9 is experimental data indicating the relationship between the distance between the cylindrical wing and the flow blocking unit and Magnus force suppression effect.

FIG. 9 is experimental data obtained as a result of experiments conducted using a cylindrical wing with ribs (diameter: 100 mm) and a plate-like flow blocking unit (width: 100 mm, thickness: 5 mm) extending in the opposite direction with respect to the travelling direction of the cylindrical wing under a condition of wind speed: 5 m/s.

Figure 10:
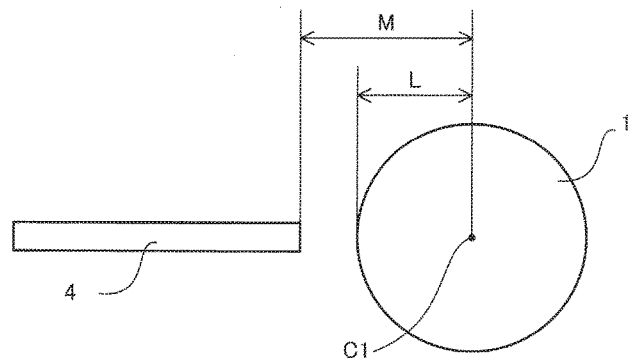
FIG. 10 is a view illustrating the distance between a first rotation axis and a part of the surface of the cylindrical wing that is farthest from the first rotation axis and the distance between the first rotation axis and a part of the surface of the flow blocking unit that is closest to the first rotation axis.

FIG. 10 is a view illustrating a distance L between the first rotation axis C1 and a part of the surface of the cylindrical wing 1 that is farthest from the first rotation axis C1 and a distance M between the first rotation axis C1 and a part of the surface of the flow blocking unit 4 that is closest to the first rotation axis C1.

In the graph of FIG. 9, the horizontal axis indicates a value obtained by dividing the distance (M−L (M: distance between the center of the cylindrical wing and the flow blocking unit, L: radius of the cylindrical wing)) between the cylindrical wing and the flow blocking unit by L. The vertical axis indicates the measurement value of the Magnus force. The term "airflow deceleration side" refers to the Magnus force generated when the flow blocking unit is provided only the airflow deceleration side (corresponding to the case of FIG. 1A), and the term "airflow acceleration side" refers to the Magnus force generated when the flow blocking unit is provided only the airflow acceleration side (corresponding to the case of FIG. 1B). The term "difference" refers to the difference between the Magnus force generated in the case of "airflow deceleration side" and the Magnus force generated in the case of "airflow acceleration side".

The graph of FIG. 9 illustrates the following items.

That is, when the flow blocking unit is provided on the airflow deceleration side, a substantially constant positive Magnus force is generated regardless of the value of (M−L)/L.

On the other hand, when the flow blocking unit is provided on the airflow acceleration side, a negative Magnus force becomes less as the value of (M−L)/L is smaller.

Thus, the smaller the value of (M−L)/L, the larger the difference between the Magnus force generated when the flow blocking unit is provided on the airflow deceleration side and the Magnus force generated when the flow blocking unit is provided on the airflow acceleration side becomes.

When the value of (M−L)/L exceeds 2, the above-mentioned difference becomes substantially 0. This implies that the Magnus force generated when the flow blocking unit is provided on the airflow deceleration side and the Magnus force generated when the flow blocking unit is provided on the airflow acceleration side cancel each other as a whole, so that effects of the present invention cannot be obtained.

Thus, the value of (M−L)/L is desirably smaller than 2, more desirably smaller than 1, and still more desirably smaller than 0.4.

Fourth Embodiment

Next, a Magnus type thrust generating device according to a fourth embodiment of the present invention will be described.

FIGS. 11A to 11F are plan views each illustrating the cylindrical wing 1 according to the fourth embodiment of the present invention.

The Magnus type thrust generating device according to the fourth embodiment differs in terms of the cross-sectional shape of the cylindrical wing 1. The cylindrical wing 1 according to the fourth embodiment has optional unevenness on its surface.

Figure 11A:
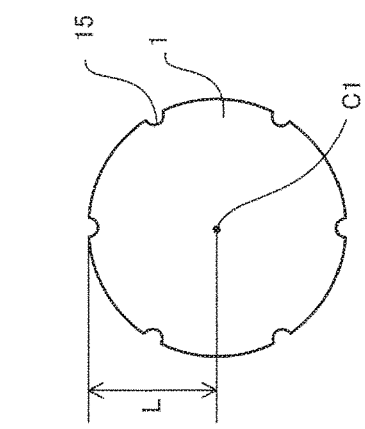
FIGS. 11A to 11F are plan views each illustrating a cylindrical wing according to a fourth embodiment of the present invention.

In the cylindrical wing 1 illustrated in FIG. 11A, three ribs 13 each having a triangular cross section are formed on the surface thereof so as to be parallel to the rotation axis C1.

Although the number of the ribs 13 is not especially limited, it is preferably about three to eight. The height of each rib 13 is preferably equal to or less than 10% of the diameter of the cylindrical wing 1. The distance between the first rotation axis C1 and the highest position of each rib 13 is defined as the distance L between the first rotation axis C1 and a part of the surface of the cylindrical wing 1 that is farthest from the first rotation axis C1, as illustrated in FIG. 11A.

Figure 11B:
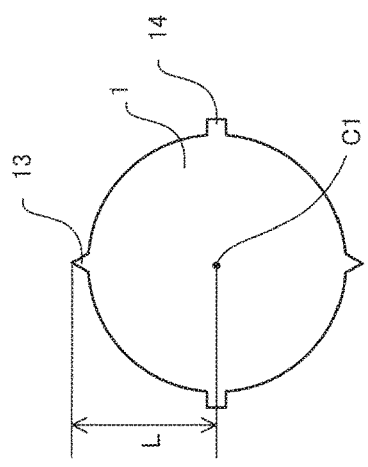

In the cylindrical wing 1 illustrated in FIG. 11B, two ribs 13 each having a triangular cross section and two ribs 14 each having a quadrangular cross section are formed on the surface thereof so as to be parallel to the rotation axis C1. Although the number of the ribs 13 and that of the ribs 14 are each not especially limited, the total number of the ribs 13 and 14 is preferably about three to eight. The height of the rib 13 and that of the rib 14 are each preferably equal to or less than 10% of the diameter of the cylindrical wing 1. The distance between the first rotation axis C1 and the highest position of the rib 13 or rib 14 is defined as the distance L between the first rotation axis C1 and a part of the surface of the cylindrical wing 1 that is farthest from the first rotation axis C1, as illustrated in FIG. 11B.

Figure 11C:
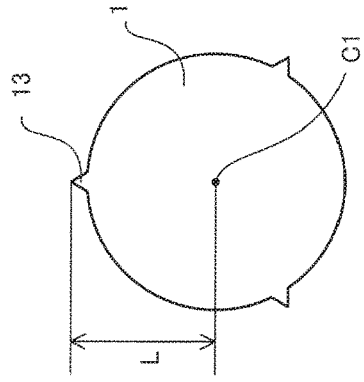

In the cylindrical wing 1 illustrated in FIG. 11C, six cuts 15 each having a circular arc cross section are formed on the surface thereof so as to be parallel to the rotation axis C1. Although the number of the cuts 15 is not especially limited, it is preferably about three to eight. The depth of each cut 15 is preferably equal to or less than 10% of the diameter of the cylindrical wing 1. The distance between the first rotation axis C1 and the surface of the cylindrical wing 1 is defined as the distance L between the first rotation axis C1 and a part of the surface of the cylindrical wing 1 that is farthest from the first rotation axis C1, as illustrated in FIG. 11C.

Figure 11D:
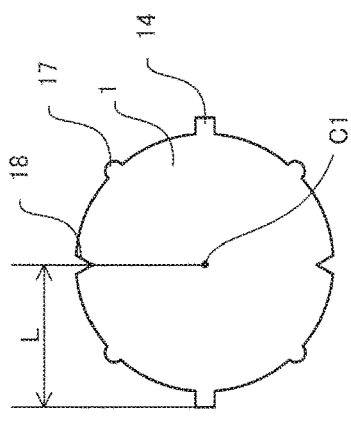

In the cylindrical wing 1 illustrated in FIG. 11D, four cuts 15 each having a circular arc cross section and four cuts 16 each having a quadrangular cross section are formed on the surface thereof so as to be parallel to the rotation axis C1. Although the number of the cuts 15 and that of the cuts 16 are each not especially limited, the total number of the cuts 15 and 16 is preferably about three to eight. The depth of the cut 15 and that of the cut 16 are each preferably equal to or less than 10% of the diameter of the cylindrical wing 1. The distance between the first rotation axis C1 and the surface of the cylindrical wing 1 is defined as the distance L between the first rotation axis C1 and a part of the surface of the cylindrical wing 1 that is farthest from the first rotation axis C1, as illustrated in FIG. 11D.

Figure 11E:
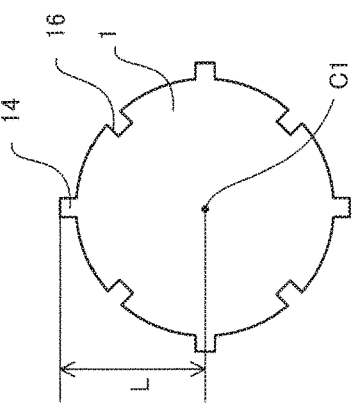

In the cylindrical wing 1 illustrated in FIG. 11E, four ribs 14 each having a quadrangular cross section and four cuts 16 each having a quadrangular cross section are formed on the surface thereof so as to be parallel to the rotation axis C1. Although the number of the ribs 14 and that of the cuts 16 are each not especially limited, the total number of the ribs 14 and cuts 16 is preferably about three to eight. The height of the rib 14 and the depth of the cut 16 are each preferably equal to or less than 10% of the diameter of the cylindrical wing 1. The distance between the first rotation axis C1 and the highest position of each rib 14 is defined as the distance L between the first rotation axis C1 and a part of the surface of the cylindrical wing 1 that is farthest from the first rotation axis C1, as illustrated in FIG. 11E.

Figure 11F:
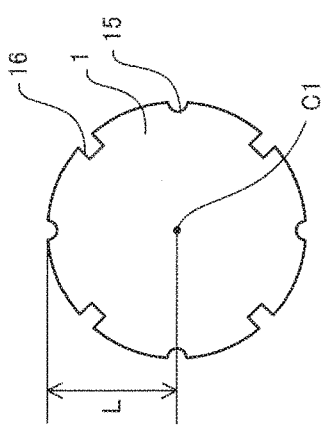

In the cylindrical wing 1 illustrated in FIG. 11F, two ribs 14 each having a quadrangular cross section, two ribs 17 each having a circular arc cross section, and two cuts 18 each having a triangular cross section are formed on the surface thereof so as to be parallel to the rotation axis C1. Although the number of the ribs 14, that of the ribs 17, and cuts 18 are each not especially limited, the total number of the ribs 14, ribs 17, and cuts 18 is preferably about three to eight. The height of the rib 14, height of the rib 17, and the depth of the cut 18 are each preferably equal to or less than 10% of the diameter of the cylindrical wing 1. The distance between the first rotation axis C1 and the highest position of each rib 14 is defined as the distance L between the first rotation axis C1 and a part of the surface of the cylindrical wing 1 that is farthest from the first rotation axis C1, as illustrated in FIG. 11F.

The cylindrical wing 1 is an example of the first member of the present invention, and the ribs 13, 14 and 17 and cuts 15, 16 and 18 are each an example of unevenness of the first member of the present invention.

As described above, by forming optional unevenness such as projections or cuts on the surface of the cylindrical wing 1, the Magnus force generated in the cylindrical wing 1 can be increased.

Fifth Embodiment

Next, a Magnus type thrust generating device according to a fifth embodiment of the present invention will be described.

Figure 12:
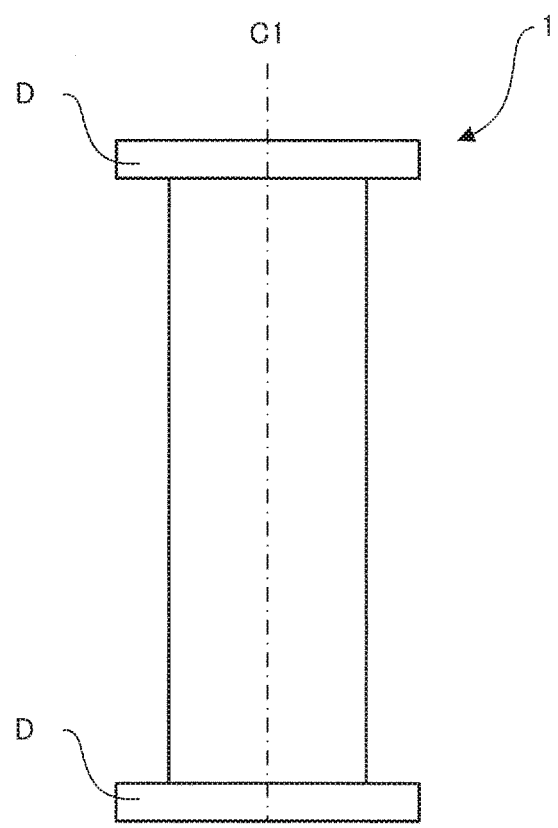
FIG. 12 is a front view illustrating a cylindrical wing according to a fifth embodiment of the present invention.

FIG. 12 is a front view of the cylindrical wing 1 according to the fifth embodiment of the present invention.

In the Magnus type thrust generating device according to the fifth embodiment, a large diameter part D is formed at the both ends of the cylindrical wing 1 in the first rotation axis C1 direction. The large diameter part D is rotated integrally with the cylindrical wing 1. By forming the large diameter part D at both ends of the cylindrical wing 1, the flows generated near the center and both ends of the cylindrical wing 1 are made uniform, with the result that the Magnus force generated in the cylindrical wing 1 is increased.

INDUSTRIAL APPLICABILITY

The Magnus type thrust generating device according to the present invention can efficiently control the magnitude of the Magnus force generated in the cylindrical wing according to the direction of the airflow acting on the cylindrical wing with a simple structure and is useful as a thrust generating device for driving a wind power rotating device, a hydraulic rotating device, a tidal power rotating device, and a fluid machinery such as a wind power generator, a hydraulic power generator, and tidal power generator.

REFERENCE SIGNS LIST

1, 1*a*, 1*b*, 1*c*: Cylindrical wing
2, 2*a*, 2*b*, 2*c*: Rotation direction of cylindrical wing
3, 3*a*, 3*b*, 3*c*: Travelling direction of cylindrical wing
4, 4*a*, 4*b*, 4*c*: Flow blocking unit
5: Flow direction
6, 6*a*, 6*b*, 6*c*: Magnus force
7: Groove
8: Dimple or projection
9: Vortex generator
10: Projection or cut
11, 11*a*, 11*b*, 11*c*, 11*d*, 11*e*: Support member
12: Second rotation axis
13: Azimuth angle of Magnus type thrust generating device

The invention claimed is:

1. A Magnus type thrust generating device characterized by comprising:
a first member having a first rotation axis as a vertical axis and rotatable about the first rotation axis; and
a second member disposed on the back surface side with respect to the travelling direction of the first member, wherein
the first and second members are revolvable around the second rotation axis extending parallel to the first rotation axis, and
in a plane perpendicular to the first rotation axis of the Magnus type thrust generating device, $(M-L)/L<2$ is satisfied where L is the distance between the first rotation axis and a part of the surface of the first member that is farthest from the first rotation axis, and M is the distance between the first rotation axis and a part of the surface of the second member that is closest to the first rotation axis.

2. The Magnus type thrust generating device according to claim 1, wherein
the second member has a substantially plate-like shape extending in the direction opposite to the travelling direction of the first member.

3. The Magnus type thrust generating device according to claim 1, wherein
the second member has a substantially streamlined shape extending in the direction opposite to the travelling direction of the first member.

4. The Magnus type thrust generating device according to claim 1, wherein
the second member has optional unevenness on its surface.

5. The Magnus type thrust generating device according to claim 1, wherein
the first member has optional unevenness on its surface.

6. A wind power rotating device, a hydraulic rotating device, or a tidal power rotating device using the Magnus type thrust generating device as claimed in claim 1.

* * * * *